(12) United States Patent
Reina

(10) Patent No.: US 7,813,416 B2
(45) Date of Patent: Oct. 12, 2010

(54) LOW LATENCY SIGNALING SCHEME FOR MODE TRANSITION IN DMT MODEMS

(75) Inventor: Guy Reina, Givatayim (IL)

(73) Assignee: St. Microelectronics Ltd., Netanya (IL)

( * ) Notice: Subject to any disclaimer, the term of this patent is extended or adjusted under 35 U.S.C. 154(b) by 1636 days.

(21) Appl. No.: 11/014,452

(22) Filed: Dec. 15, 2004

(65) Prior Publication Data

US 2005/0271129 A1    Dec. 8, 2005

Related U.S. Application Data

(60) Provisional application No. 60/578,815, filed on Jun. 8, 2004.

(51) Int. Cl.
*H04B 1/38* (2006.01)
(52) U.S. Cl. ...................... 375/222; 375/260
(58) Field of Classification Search .................. 375/222
See application file for complete search history.

(56) References Cited

U.S. PATENT DOCUMENTS

| | | | |
|---|---|---|---|
| 6,370,156 B2 * | 4/2002 | Spruyt et al. ................ 370/480 |
| 6,654,410 B2 * | 11/2003 | Tzannes ..................... 375/222 |
| 6,850,539 B1 * | 2/2005 | Cassiers et al. ............. 370/465 |
| 2001/0014101 A1 * | 8/2001 | Spruyt et al. ................ 370/419 |
| 2002/0196861 A1 * | 12/2002 | Tzannes et al. ............. 375/261 |
| 2003/0118089 A1 | 6/2003 | Deczky |
| 2003/0210739 A1 * | 11/2003 | Tzannes ..................... 375/219 |
| 2004/0057528 A1 * | 3/2004 | Tzannes ..................... 375/260 |
| 2005/0195907 A1 * | 9/2005 | Jain ........................... 375/260 |
| 2005/0207483 A1 * | 9/2005 | Polk, Jr. ..................... 375/222 |
| 2005/0213405 A1 * | 9/2005 | Stopler ....................... 365/203 |

FOREIGN PATENT DOCUMENTS

WO    WO 02/78244    10/2002

OTHER PUBLICATIONS

U.S. Appl. No. 60/578,815, "Low latency signaling scheme for low power mode exit in DMT modems", Jun. 8, 2004.
Oksman, Vladimir, "Proposal on OLR SyncFlag for VDSL2", (Infineon Technologies, Contribution T1E1.4/2003-466, Presented at Working Group T1E1.4 (DSL Access), Charlotte, North Carolina, May 24-27, 2004.
Section 8.6 for ITU-U Recommendation G.992.3, entitled Series G: Transmission Systems and Media, Digital Systems and Networks: Digital Sections and Digital Line System—Access Networks; Asymmetric Digital Subscriber Line Transceivers 2 (ADSL2) (international Telecommunication Union, 2002).
International Search Report of International Patent Application No. PCT/IL2005/000609, 2005.

* cited by examiner

*Primary Examiner*—Shuwang Liu
*Assistant Examiner*—Michael R Neff
(74) *Attorney, Agent, or Firm*—D. Kligler I.P. Services Ltd.

(57) ABSTRACT

A method for coordinating and synchronizing a mode transition in a Discrete Multi-Tone (DMT) communication system operating over a range of tones. The method includes allocating a set of one or more of the tones in the range to serve as monitor tones for signaling the mode transition. The mode transition is signaled by transmitting a known transition sequence on the monitor tones over two or more successive symbol intervals while simultaneously transmitting data on at least some of the tones in the range other than the monitor tones.

30 Claims, 3 Drawing Sheets

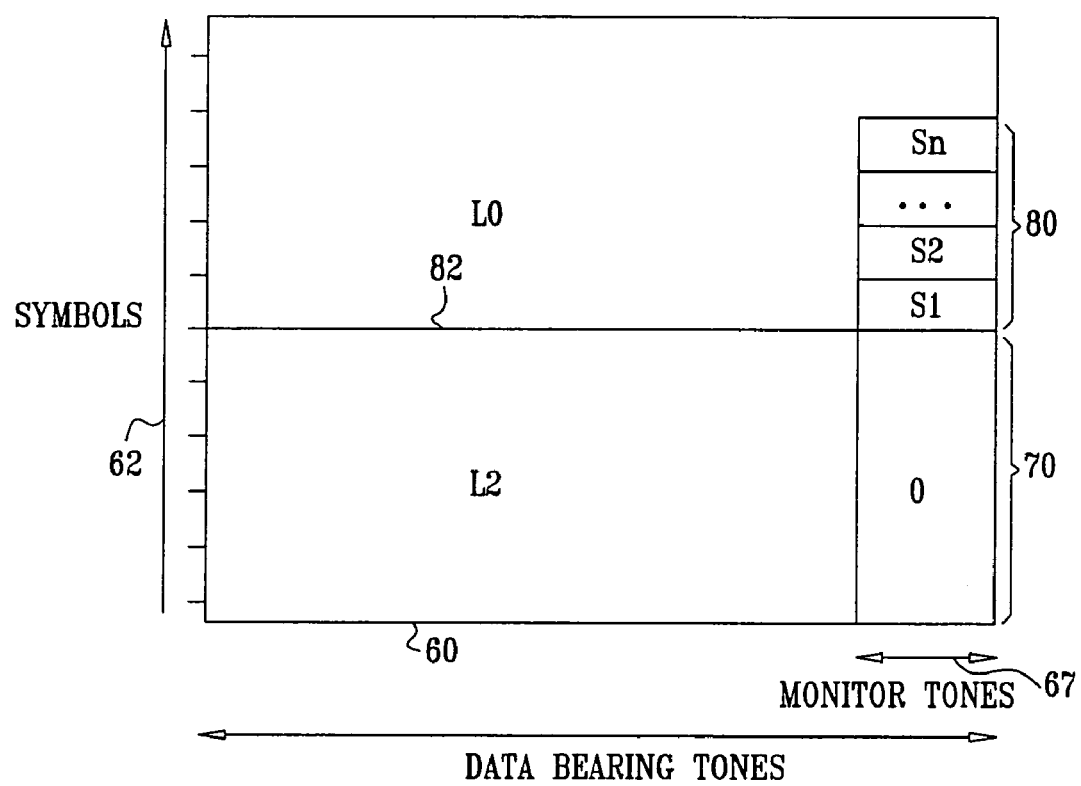

LOW LATENCY SIGNALING SCHEME FOR MODE TRANSITION IN DMT MODEMS

CROSS-REFERENCE TO RELATED APPLICATIONS

This application claims the benefit of U.S. Provisional Patent Application 60/578,815, filed Jun. 8, 2004, which is incorporated herein by reference.

FIELD OF THE INVENTION

The present invention relates generally to high-speed digital communication systems, and specifically to signaling schemes for providing seamless and robust transition from low-power to high-power modes in DMT modems.

BACKGROUND OF THE INVENTION

Discrete multi-tone (DMT) modulation is used in many types of data communication systems, among them Multi-carrier Very-high-speed Digital Subscriber Line (VDSL) modems, as well as Asymmetric DSL (ADSL). In these systems, N tones are modulated by QAM two-dimensional input frequency-domain symbols. A 2N-point Inverse Fast Fourier Transform (IFFT) then produces a corresponding time-domain symbol, expressed as a real baseband time-domain output signal of 2N real samples in each symbol period. At the receiving side, 2N samples are extracted from the time-domain signal during each symbol period. A FFT is used to demodulate the signal and recover the original QAM symbols on the N tones.

The number of bits to be encoded by each tone, known as the bit loading, is determined by the receiver according to the line conditions, which are measured as a function of frequency during a training period. The receiver passes a table of these values, known as the bit-loading table, to the transmitter, which thus determines how many bits of the input data stream to allocate to each successive tone in the tone order.

Similarly, a gain table which determines the required relative transmitter power for each tone is passed to the transmitter.

DMT systems typically support an additional, low power mode which is used whenever there is little or no data to transmit. For example, the ITU ADSL2 specification (ITU-T Recommendation G.992.3), entitled *Series G: Transmission Systems and Media, Digital Systems and Networks; Digital Sections and Digital Line System—Access Networks; Asymmetric Digital Subscriber Line Transceivers 2 (ADSL2)* (International Telecommunication Union, 2002), defines a low-power mode, referred to as L2 mode, in section 9.5 (pages 185-189) and section 8.7 (pages 82-84), which are incorporated herein by reference. In the L2 mode, the downstream signals are transmitted using different bit-loading and gain tables from the standard tables used in the high-power mode, which is referred to as L0. The L2 bit-loading and gain tables reflect the lower data rate and lower transmit power that are used in this mode.

Transition from low-power to high-power mode must be coordinated between the transmitter and the receiver, so that the receiver uses the correct bit-loading and gain values. In the ADSL2 specification cited above, mode switching is signaled by transmitting a unique, predetermined sequence referred to as a "transition sequence." The transition sequence uses all of the transmitted tones for the duration of two symbols. The detailed structure of this mechanism can be found in section 8.7.6 of ITU Recommendation G.992.3 mentioned above.

There are additional instances in which gain tables and/or bit-loading tables must be changed in a coordinated fashion between the transmitter and receiver. One example of such a mode switching operation is Seamless Rate Adaptation (SRA), described in the ADSL2 specification cited above.

An alternative signaling scheme was proposed by Oksman, in a paper entitled "Proposal on OLR SyncFlag for VDSL2," (Infineon Technologies, Contribution T1E1.4/2003-466, presented at Working Group T1E1.4 (DSL Access), Charlotte, N.C., May 24-27, 2004), which is incorporated herein by reference. In this proposal, a sub-group of the transmitted tones is allocated during a single symbol period to transmit a unique symbol, which signals a transition.

SUMMARY OF THE INVENTION

Signaling a mode transition on a high-speed DMT communication channel typically uses the same channel resources as the transmitted data. Therefore, to use the resources efficiently, it is desirable that the signaling method be fast and introduce as little latency into the channel as possible. The method should also be robust enough to maintain its performance under severe noise conditions, particularly impulse noise.

The scheme recommended by the ADSL2 specification cited above for transition from low-power to high-power mode, introduces a minimum delay of two symbols. This delay has an impact on the memory storage requirements in the receiver, particularly at the high rate of VDSL modems. Therefore, there is strong motivation to provide alternative signaling schemes that introduce less latency while maintaining acceptable robustness to noise and interference. While the scheme proposed in the above-mentioned contribution by Oksman reduces the signaling latency, it remains susceptible to noise and interference. If the receiver fails to detect the made transition signal sent by the transmitter, the receiver will lose synchronization, and the entire connection may have to be re-initialized.

In response to these shortcomings of the prior art, embodiments of the present invention provide a scheme for signaling a transition from low-power to high-power mode that offers minimal latency together with high robustness in the presence of noise and interference. The transmitter signals the transition by transmitting a transition sequence of signals on a group of monitor tones over a number of successive symbols. The group may comprise only a single tone, but using a plurality of monitor tones in the group provides inherent frequency diversity. Spreading the sequence in time over several successive symbol intervals provides inherent time diversity and hence high immunity to noise. Time diversity is particularly effective against bursty interference such as impulse noise. While the transition sequence is transmitted on the monitor tones, transmission of useful data bits continues seamlessly using the remaining, data-bearing tones.

Although the embodiments described herein focus on transition from low-power to high-power mode, the methods disclosed are general and can be applied to other sorts of mode transitions in DMT systems, such as updating bit-loading tables and gain tables (sometimes denoted OLR—On Line Reconfiguration). In all of these applications, embodiments of the present invention provide the same benefits of low latency and immunity to interference.

There is therefore provided, in accordance with an embodiment of the present invention, a method for coordinating and synchronizing a mode transition in a Discrete Multi-Tone (DMT) communication system operating over a range of tones, the method including:

allocating a set, of one or more of the tones in the range to serve as monitor tones for signaling the mode transition; and signaling the mode transition by transmitting a known transition sequence on the monitor tones over two or more successive symbol intervals while simultaneously transmitting data on at least some of the tones in the range other than the monitor tones.

In one embodiment, allocating the set of one or more of the tones includes allocating a plurality of the tones to serve as monitor tones.

In another embodiment, signaling the mode transition includes receiving and detecting the transition sequence at a receiver and, responsively to detection of the transition sequence, determining a transition time at which to implement the mode transition at the receiver. Signaling the mode transition may include transmitting at least first and second transition symbols in successive first and second symbol intervals, respectively, and detecting the transition sequence may include detecting the first transition symbol, and determining the transition time responsively to the first transition symbol.

In another embodiment, signaling the mode transition includes transmitting at least first and second transition symbols in successive first and second symbol intervals, respectively, and detecting the transition sequence includes, in case of a failure to detect the first transition symbol, determining the transition time responsively to detecting the second transition symbol. In still another embodiment, signaling the mode transition includes transmitting at least first and second transition symbols in successive first and second symbol intervals, respectively, and detecting the transition sequence includes determining the transition time responsively to detecting both of the first and second transition symbols.

In yet another embodiment, the mode transition includes updating at least one of a gain table and a bit-loading table at the receiver responsively to the mode transition at the transition time. In still another embodiment, the mode transition includes a change from a first data transmission mode to a second data transmission mode, and signaling the mode transition includes transmitting a first transition symbol in the transition sequence simultaneously with transmission of a first data symbol in the second data transmission mode. In a further embodiment, the mode transition includes a change from a first data transmission mode to a second data transmission mode, and signaling the mode transition includes transmitting a first transition symbol in the transition sequence one symbol interval before transmission of a first data symbol in the second data transmission mode.

In an embodiment, allocating the set of one or more monitor tones includes selecting the monitor tones based on channel conditions.

In a disclosed embodiment, the mode transition includes a change from a low-power transmission mode to a high-power transmission mode, and the method includes transmitting the data on the monitor tones in the high-power mode.

In another embodiment, allocating the set of one or more of the tones includes using the monitor tones in the low-power mode only for transmitting the transition sequence, and not for transmitting the data.

In another embodiment, data is transmitted on the monitor tones in the low-power mode except while transmitting the transition sequence.

In a disclosed embodiment, signaling the mode transmission includes determining a timing of the mode transition relative to the transition sequence by negotiation between a transmitter and a receiver in the DMT communication system.

In another embodiment, transmitting the known transition sequence includes applying a predetermined manipulation to pseudo-random data transmitted on the monitor tones during the two or more successive symbol intervals. Alternatively or additionally, transmitting the known transition sequence includes transmitting constant information in a first group of the monitor tones and transmitting time-varying information in a second group of the monitor tones.

There is further provided, in accordance with an embodiment of the present invention, apparatus for digital communication, including a transmitter, which is adapted to transmit digital data over a range of tones in accordance with a discrete multi-tone (DMT) modulation scheme in either of a first transmission mode and a second transmission mode, and which is adapted to signal a mode transition from the first transmission mode to the second transmission mode by transmitting a known transition sequence on a set of one or more monitor tones, which are allocated from among the tones in the range, over two or more successive symbol intervals while simultaneously transmitting data on at least some of the tones in the range other than the monitor tones.

A disclosed embodiment includes a receiver, which is arranged to receive and detect the transition sequence and, responsively to detection of the transition sequence, to determine a transition time at which to implement the mode transition.

The present invention will be more fully understood from the following detailed description of the embodiments thereof, taken together with the drawings in which:

BRIEF DESCRIPTION OF THE DRAWINGS

FIG. 4 is a plot that schematically illustrates a signaling scheme used in transition from low-power to high-power mode, in accordance with another embodiment of the present invention.

DETAILED DESCRIPTION OF EMBODIMENTS

Figure 1:
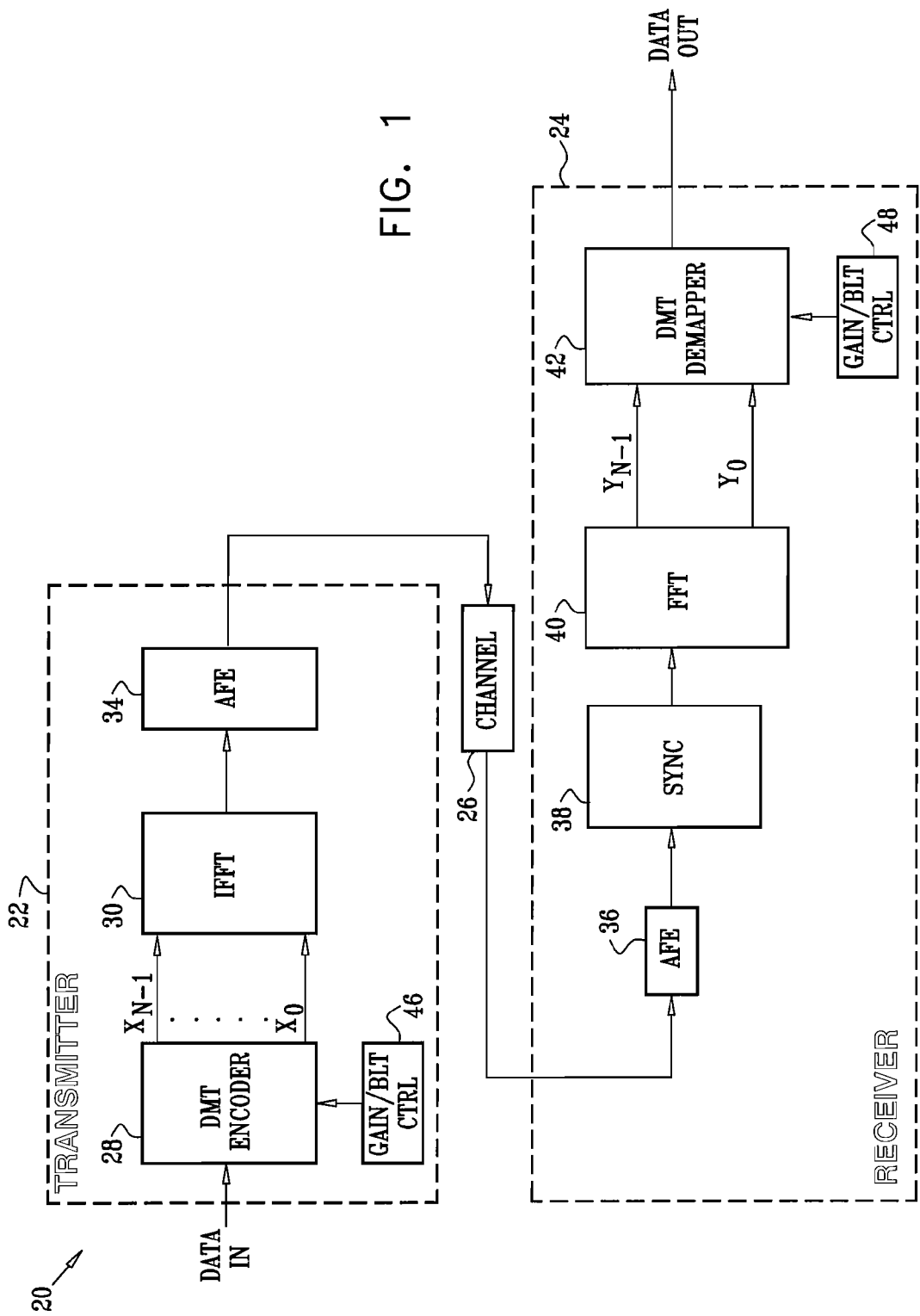
FIG. 1 is a block diagram that schematically illustrates a DMT communication system, in accordance with an embodiment of the present invention.

FIG. 1 is a block diagram that schematically illustrates a DMT communication system 20, in accordance with an embodiment of the present invention. In this exemplary embodiment, it will be assumed for the sake of convenience and clarity of illustration that system 20 operates in accordance with the ADSL2 specification cited above, although the present invention is by no means limited in its applicability to systems of this specific type. For example, the principles embodied in system 20 may be applied in VDSL communications, as well as in other multi-tone transmission schemes.

For the sake of simplicity, the figures in the present patent application show only those elements of transmitter 22 and receiver 24 that are useful to understanding the operation of the present invention. The additional elements required for a complete implementation of system 20 will be apparent to those skilled in the art. The elements of transmitter 22 and receiver 24 that are shown in the figures may be implemented using either hard-wired or programmable components, or a combination of different component types. Although for reasons of conceptual clarity, the figures show the transmitter and receiver as comprising certain functional blocks, in actual implementations these blocks may be combined into a single circuit component, or their functions may be divided among several different circuit components, as will be apparent to those skilled in the art.

Transmitter 22 comprises a DMT encoder 28, which receives a stream of digital input data. The encoder modulates the data onto an array of tones 0 through N−1, thus generating frequency-domain symbols $X_0$ through $X_{N-1}$. The relative transmit power of each tone and the number of bits allocated to each tone are determined in accordance with a gain table and a bit-loading table (BLT), held by a transmit gain/BLT controller 46. An IFFT circuit 30 converts the symbols into a time-domain symbol comprising a sequence of 2N real digital samples. An analog front end (AFE) 34 converts the digital samples to analog signals for transmission over channel 26.

The signals are received by an AFE 36 in receiver 24, which converts the signals to a time-domain sequence of digital samples. A synchronization circuit 38 recovers the symbol timing in the sample stream and thus finds the samples corresponding to the time-domain symbol within each data block. The samples corresponding to the time-domain symbol are input to a FFT circuit 40, typically of length 2N, which generates an array of complex frequency-domain samples $Y_0$ through $Y_{N-1}$. A demapper 42 then recovers the transmitted data by demodulating each of the tones in accordance with the bit-loading values provided by a receive gain/BLT controller 48. Typically, as noted earlier, controllers 46 and 48 maintain two sets of gain and bit-loading values—one for high-power (L0) mode, and the other for low-power (L2) mode.

Figure 2:
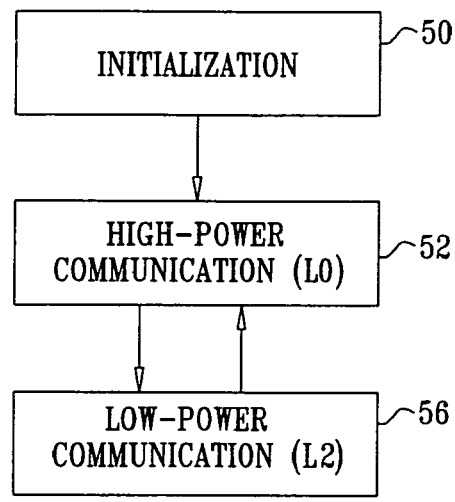
FIG. 2 is a state diagram that illustrates operating states of a DMT communication system and transitions between the states, in accordance with an embodiment of the present invention.

FIG. 2 is a state diagram that illustrates operating states of a DMT communication system, such as system 20, and transitions between the states, in accordance with an embodiment of the present invention. The state diagram shown here is a simplification and does not attempt to describe the entire state structure of a DMT communication system. Only items that are relevant to embodiments of the present invention and their understanding are shown.

System 20 starts up in an initialization mode 50. Initialization typically includes setting the gain and bit-loading tables for a high-power mode (L0) 52 and a low-power mode (L2) 56, as is known in the art. Alternatively, the L2 gain and bit-loading tables may be transferred during normal operation as part of the message requesting entry into L2, or its acknowledgment. In the initialization mode, the receiver selects a sub-group of tones to be used by the transmitter in transmitting a transition sequence to signal transition from the L2 to the L0 mode. The tones selected are referred to herein as "monitor tones." Monitor tones may be selected based on signal-to-noise criteria or other channel conditions. The indices of these tones are passed from the receiver to the transmitter. In one embodiment, the receiver passes the monitor tone indices to the transmitter as part of the customer premises equipment (CPE) acknowledgement message that the CPE sends upstream when the central office (CO) transmitter signals that it is entering the L2 mode. In other embodiments the indices may be transferred at start-up or using a dedicated message.

In some embodiments, the monitor tones have a special function only when the system is in low-power mode 56. When in high-power mode 52 they continue to carry useful information and are equivalent to all other tones. When in low-power mode 56, the monitor tones are used to signal the receiver to move from low-power mode 56 to high-power mode 52. The remaining tones, referred to as "data-bearing tones," continue to transmit useful information without interruption. In one embodiment, the monitor tones carry no useful information (other than the transition sequence) when in low-power mode 56 and are treated as zero-loaded tones, disregarding the low-power mode bit-loading tables. In other embodiments, the monitor tones may carry useful information unless used for transmitting the transition sequence. In yet another embodiment the monitor tones do not carry any data bits at all, regardless of the power mode, and are used exclusively for signaling.

Following successful initialization, system 20 moves automatically to high-power communication mode 52. High-power mode 52 is the normal operating state for the system. The monitor tones may have different functions in this mode, as noted above.

At times when there is little or no information to be transmitted, transmitter 22 may decide to switch to low-power mode 56, in order to conserve energy and minimize radiation, heat and interference. The transmitter signals the transition from high-power mode 52 to low-power mode 56 using methods known in the art, which are outside the scope of this patent application. For example, in the ADSL2 specification cited above, the transition from L0 to L2 is performed using the standard overhead messaging channel.

When system 20 enters low-power mode 56, both bit-, loading and gain tables are updated to reflect the lower data-rate and transmit power. Receiver 24, in addition to its normal tasks, demodulates the information transmitted over the monitor tones and attempts to detect the transition sequence, which marks the transition from low-power mode 56 to high-power mode 52. Various methods may be used to detect and respond to the transition sequence, for example:

- Receiver 24 may monitor the monitor tones until it detects the first symbol of the transition sequence. At this point the receiver may immediately calculate the exact timing of transition and switch its gain and bit-loading tables to the L0 values. This method provides minimum latency in transition from L2 to L0.
- Alternatively, receiver 24 may wait for one or more subsequent symbols in the sequence before making the transition, in order to increase its confidence. A soft decision strategy, based on the detection of several symbols in the sequence, may be used for this purpose. Suitable strategies will be apparent to those skilled in the art, such as signal/noise ratio (SNR) metrics and symbol erasure techniques.

Typically, receiver 24 tries to detect all of the transition sequence symbols in parallel. This strategy enables successful detection of the mode transition even if the receiver failed to detect the first symbol (due to a burst of interference, for example). Although the receiver may detect the mode transition belatedly if it misses the first symbol in the transition sequence, the consequence will be only a certain loss of data, rather than complete loss of synchronization. Other decision strategies will be apparent to those skilled in the art and are considered to be within the scope of the present invention.

In another embodiment of the present invention, the monitor tones are divided into two groups. In the course of the transition sequence, the transmitter transmits constant information in a first group of the monitor tones and time-varying information in the second group. This technique enables the receiver to operate sequentially, first detecting the presence of the sequence using the first group, then detecting the timing within the sequence using the second group of tones. This approach may simplify the receiver design, since it obviates the need for the receiver to simultaneously attempt to detect all the different symbols in the transition sequence while in L2 mode. Instead, the receiver need only detect the constant information in the first group of the monitor tones in order to determine that a mode transition is in progress.

Regardless of the receiver strategy used, when receiver 24 detects the transition sequence, it calculates the correct timing for switching to high-power mode 52. At the correct symbol, receiver 24 updates its bit-loading table and gain table to the standard, high-power values and thus switches to high-power mode 52.

Figure 3:
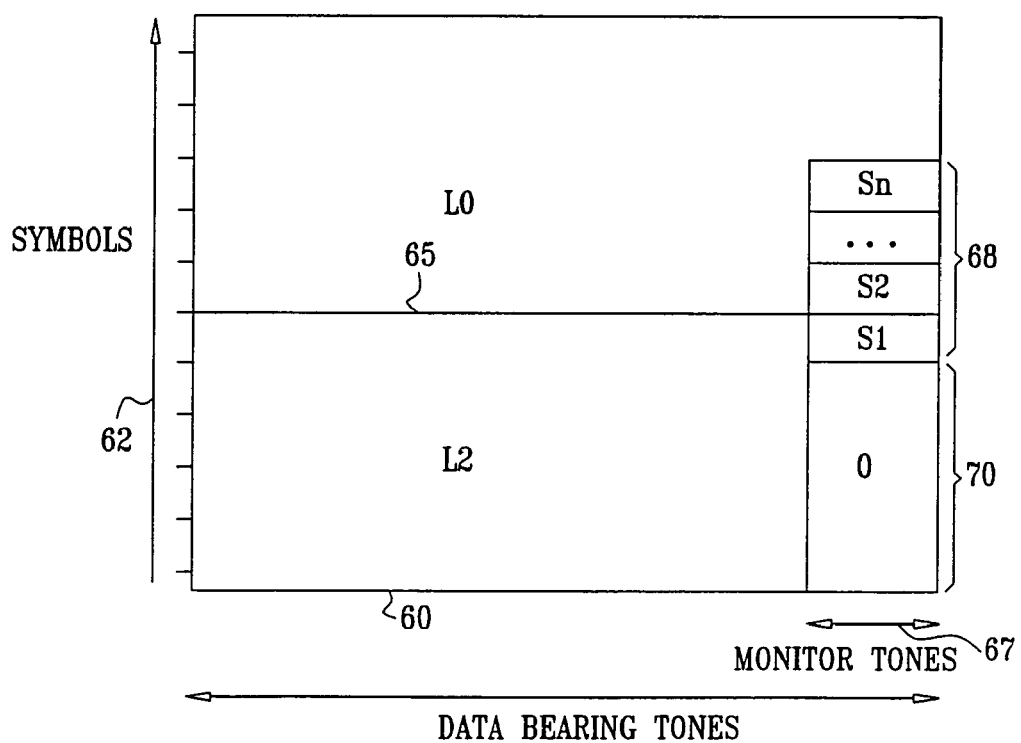
FIG. 3 is a plot that schematically illustrates a signaling scheme used in transition from low-power to high-power mode, in accordance with an embodiment of the present invention.

FIG. 3 is a plot that schematically illustrates a scheme for signaling the transition from L2 to L0 mode, in accordance with an embodiment of the present invention. This embodiment provide low latency and high immunity to impulse noise. A horizontal axis 60 denotes the tone (frequency) domain, while a vertical axis 62 is a time axis divided into symbol intervals. Initially DMT system 20 operates in low-power mode (L2). At a transition time 65, the transmitter switches to high-power transmission mode (L0). At transition time 65, the transmitter updates its bit-loading and gain tables to the predetermined high-power values.

A set of monitor tones 67 is used by the transmitter to signal the transition from L2 to L0. In the low-power mode, these tones carry no useful information, as shown by an area 70. To signal the transition, the transmitter transmits a transition sequence 68 of n transition symbols (S1, S2, . . . , Sn) on monitor tones 67. In the embodiment shown FIG. 3, transition sequence 68 begins while system 20 is still in low-power mode L2 and ends n–1 symbols after system 20 has switched to high-power mode L0. Therefore, the receiver will determine that transition time 65 is to occur immediately following the symbol period in which it detects S1 in area 70, and will switch to the L0 bit-loading and gain table values at that point. Alternatively, in the event that the receiver fails to detect S1 (due to a burst of interference, for example), it will switch to the L0 bit-loading and gain values immediately upon detecting a subsequent symbol in transition sequence 68 and will re-synchronize its demapper with the transmitter at that point.

In other embodiments, transition sequence 68 may begin at different offsets relative to the desired transition time 65. In one embodiment, the length of transition sequence 68 and the exact timing of the transition from low-power mode to high-power mode with respect to transition sequence 68, are predetermined and fixed. In another embodiment, these values may be negotiated between receiver 24 and transmitter 22.

In another disclosed embodiment, transition sequence 68 may comprise a predetermined manipulation of the pseudo-random data that would have been transmitted on monitor tones 67 in low-power mode. By judicious choice of the manipulation scheme, the robustness of detection of the transition sequence may be enhanced.

FIG. 4 is a plot that schematically illustrates a scheme for signaling the transition from L2 to L0 mode, in accordance with another embodiment of the present invention. This scheme is designed to provide minimal latency between the point at which the transmitter decides to switch to L0 mode and a transition time 82 at which the mode change actually takes place. In this example, a transition sequence 80 begins at the desired transition time 82. The first symbol of transition sequence 80, denoted S1, is demodulated by the receiver at the same time as it receives the first symbol in the high-power mode. To support the minimum latency scheme, receiver 24 in low-power mode first demodulates the symbols on monitor tones 67 and only then decides which bit-loading and gain tables to apply to the remaining, data-bearing tones.

Both embodiments shown above provide a seamless, low-latency transition between L2 and L0, and provide immunity to noise and interference through the use of one or more monitor tones over several symbol intervals.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for coordinating and synchronizing a mode transition from a first transmission mode to a second transmission mode in a Discrete Multi-Tone (DMT) communication system operating over a range of tones, the method comprising:

allocating a set of one or more of the tones in the range to serve as monitor tones for signaling the mode transition; and signaling the mode transition to the second transmission mode by transmitting, while operating in the first transmission mode, a known transition sequence on the monitor tones over two or more successive symbol intervals while simultaneously transmitting data comprising useful information on at least some of the tones in the range other than the monitor tones, wherein the known transition sequence comprises constant information transmitted in a first group of the monitor tones and time-varying information transmitted in a second group of the monitor tones.

2. The method according to claim 1, and comprising: wherein the first transmission mode is a low-power transmission mode, and the second transmission mode is a high-power transmission mode; transmitting the data on the monitor tones in the high-power mode.

3. The method according to claim 2, wherein the first transmission mode is a low-power transmission mode, and the second transmission mode is a high-power transmission mode;

allocating the set of one or more of the tones comprises using the monitor tones in the low-power mode only for transmitting the transition sequence, and not for transmitting the data.

4. The method according to claim 2, wherein the first transmission mode is a low-power transmission mode, and the second transmission mode is a high-power transmission mode;

and comprising transmitting the data on the monitor tones in the low-power mode except while transmitting the transition sequence.

5. The method according to claim 1, wherein allocating the set of one or more of the tones comprises allocating a plurality of the tones to serve as the monitor tones.

6. The method according to claim 1, wherein signaling the mode transition comprises receiving and detecting the transition sequence at a receiver and, responsively to detection of the transition sequence, determining a transition time at which to implement the mode transition at the receiver.

7. The method according to claim 6, wherein signaling the mode transition comprises transmitting at least first and second transition symbols in successive first and second symbol intervals, respectively, and wherein detecting the transition sequence comprises detecting the first transition symbol, and determining the transition time responsively to the first transition symbol.

8. The method according to claim 6, wherein signaling the mode transition comprises transmitting at least first and second transition symbols in successive first and second symbol intervals, respectively, and wherein detecting the transition sequence comprises, in case of a failure to detect the first transition symbol, determining the transition time responsively to detecting the second transition symbol.

9. The method according to claim 6, wherein signaling the mode transition comprises transmitting at least first and second transition symbols in successive first and second symbol intervals, respectively, and wherein detecting the transition sequence comprises determining the transition time responsively to detecting both of the first and second transition symbols.

10. The method according to claim 6, and comprising updating at least one of a gain table and a bit-loading table at the receiver responsively to the mode transition at the transition time.

11. The method according to claim 1, wherein signaling the mode transition comprises transmitting a first transition symbol in the transition sequence simultaneously with transmission of a first data symbol in the second transmission mode.

12. The method according to claim 1, wherein signaling the mode transition comprises transmitting a first transition symbol in the transition sequence one symbol interval before transmission of a first data symbol in the second transmission mode.

13. The method according to claim 1, wherein allocating the set of one or more monitor tones comprises selecting the monitor tones based on channel conditions.

14. The method according to claim 1, wherein signaling the mode transmission comprises determining a timing of the mode transition relative to the transition sequence by negotiation between a transmitter and a receiver in the DMT communication system.

15. The method according to claim 1, wherein transmitting the known transition sequence comprises applying a predetermined manipulation to pseudo-random data transmitted on the monitor tones during the two or more successive symbol intervals.

16. Apparatus for digital communication, comprising a transmitter, which is adapted to transmit digital data over a range of tones in accordance with a discrete multi-tone (DMT) modulation scheme in either a first transmission mode or a second transmission mode, and which is adapted to signal a mode transition from the first transmission mode to the second transmission mode by transmitting, while operating in the first transmission mode, a known transition sequence on a set of one or more monitor tones, which are allocated from among the tones in the range, over two or more successive symbol intervals while simultaneously transmitting data comprising useful information on at least some of the tones in the range other than the monitor tones,
wherein the known transition sequence comprises constant information transmitted in a first group of the monitor tones and time-varying information transmitted in a second group of the monitor tones.

17. The apparatus according to claim 16, wherein the first transmission mode is a low-power transmission mode, and the second transmission mode is a high-power transmission mode;
the transmitter is arranged to transmit the data on the set of one or more monitor tones in the high-power mode.

18. The apparatus according to claim 17, wherein the first transmission mode is a low-power transmission mode, and the second transmission mode is a high-power transmission mode;
the transmitter is arranged to use the set of one or more monitor tones in the low-power mode only for transmitting the transition sequence, and not for transmitting the data.

19. The apparatus according to claim 17, wherein the first transmission mode is a low-power transmission mode, and the second transmission mode is a high-power transmission mode;
the transmitter is arranged to transmit the data on the set of one or more monitor tones in the low-power mode except while transmitting the transition sequence.

20. The apparatus according to claim 16, wherein the set of one or more monitor tones comprises a plurality of tones to serve as the monitor tones.

21. The apparatus according to claim 16, and comprising a receiver, which is arranged to receive and detect the transition sequence and, responsively to detection of the transition sequence, to determine a transition time at which to implement the mode transition.

22. The apparatus according to claim 21, wherein the transmitter is arranged to transmit at least first and second transition symbols in the transition sequence in successive first and second symbol intervals, respectively, and wherein the receiver is arranged to detect the first transition symbol, and to determine the transition time responsively to the first transition symbol.

23. The apparatus according to claim 21, wherein the transmitter is arranged to transmit at least first and second transition symbols in the transition sequence in successive first and second symbol intervals, respectively, and wherein in case of a failure to detect the first transition symbol, the receiver is arranged to detect the second transition symbol and to determine the transition time responsively to detecting the second transition symbol.

24. The apparatus according to claim 21, wherein the transmitter is arranged to transmit at least first and second transition symbols in the transition sequence in successive first and second symbol intervals, respectively, and wherein the receiver is arranged to determine the transition time responsively to detecting both of the first and second transition symbols.

25. The apparatus according to claim 21, wherein the receiver is arranged to update at least one of a gain table and a bit-loading table responsively to the mode transition at the transition time.

26. The apparatus according to claim 16, wherein the transmitter is arranged to transmit a first transition symbol in the transition sequence simultaneously with transmission of a first data symbol in the second data transmission mode.

27. The apparatus according to claim 16, wherein the transmitter is arranged to transmit a first transition symbol in the transition sequence one symbol interval before transmission of a first data symbol in the second data transmission mode.

28. The apparatus according to claim 16, and comprising a receiver, which is arranged to receive and detect the transition sequence and is further arranged to select the set of one or more monitor tones based on channel conditions.

29. The apparatus according to claim 16, and comprising a receiver, which is arranged to receive and detect the transition sequence, wherein the transmitter and the receiver are arranged to determine by negotiation the timing of the mode transition relative to the transition sequence.

30. The apparatus according to claim 16, wherein the transmitter is arranged to transmit the known transition sequence by applying a predetermined manipulation to pseudo-random data transmitted on the monitor tones during the two or more successive symbol intervals.

* * * * *